(12) United States Patent
Beaudet et al.

(10) Patent No.: US 11,304,556 B2
(45) Date of Patent: Apr. 19, 2022

(54) BEVERAGE PREPARATION MACHINE EQUIPPED WITH A ROTATING STIRRING DEVICE AND A COFFEE NOZZLE

(71) Applicant: SEB S.A., Ecully (FR)

(72) Inventors: Olivier Beaudet, Rives d'Andaine (FR); Gilles Morin, Varois et Chaignot (FR)

(73) Assignee: SEB S.A.

( * ) Notice: Subject to any disclaimer, the term of this patent is extended or adjusted under 35 U.S.C. 154(b) by 350 days.

(21) Appl. No.: 16/426,711

(22) Filed: May 30, 2019

(65) Prior Publication Data
US 2019/0365142 A1    Dec. 5, 2019

(30) Foreign Application Priority Data
May 31, 2018    (FR) ...................................... 1854732

(51) Int. Cl.
*A47J 31/44*    (2006.01)
*A47J 31/46*    (2006.01)

(52) U.S. Cl.
CPC ....... *A47J 31/4489* (2013.01); *A47J 31/4482* (2013.01); *A47J 31/46* (2013.01); *A47J 31/4485* (2013.01)

(58) Field of Classification Search
CPC .... A47J 31/4489; A47J 31/4482; A47J 31/46; A47J 31/4485; A47J 31/60; A47J 43/044; A47J 31/061; A47J 31/469
(Continued)

(56) References Cited

U.S. PATENT DOCUMENTS

2007/0017376 A1 * 1/2007 Oehninger .......... A47J 31/4482
99/279
2010/0159097 A1 * 6/2010 Boussemart .......... A47J 31/061
426/431
(Continued)

FOREIGN PATENT DOCUMENTS

EP    1 833 339 A1    9/2007
EP    2 268 174 A2    1/2011
(Continued)

OTHER PUBLICATIONS

Search Report as issued in French Patent Application No. 1854732, dated Feb. 7, 2019.

*Primary Examiner* — Phuong T Nguyen
(74) *Attorney, Agent, or Firm* — Lerner, David, Littenberg, Krumholz & Mentlik, LLP

(57) ABSTRACT

A beverage preparation machine includes a frame equipped with a cup holder, a coffee dispensing nozzle including an outlet orifice and a rotating stirring device including a tool rotating about an axis and intended to cooperate with a preparation contained in a container resting on the cup holder, the rotating stirring device including a conduit for conveying hot water and/or steam toward the rotating tool. The rotating stirring device is mobile in vertical translation parallel to the axis between a top standby position, in which the rotating tool is situated above the container, and a bottom working position, in which the rotating tool is situated in the container. The outlet orifice is separated from the rotating stirring device and arranged at a constant distance from the axis so that the outlet orifice and the rotating tool are arranged above an upper opening of the container arranged on the cup holder.

14 Claims, 2 Drawing Sheets

(58) Field of Classification Search
USPC .................................. 99/279, 287, 290, 295
See application file for complete search history.

(56) References Cited

U.S. PATENT DOCUMENTS

| | | | | |
|---|---|---|---|---|
| 2011/0111109 A1* | 5/2011 | Fischer | ................... | A47J 31/41 |
| | | | | 426/474 |
| 2013/0152798 A1* | 6/2013 | Pagano | ............... | A47J 31/4489 |
| | | | | 99/287 |

FOREIGN PATENT DOCUMENTS

| | | |
|---|---|---|
| EP | 2 257 207 B1 | 3/2013 |
| FR | 3 056 896 A1 | 4/2018 |
| WO | WO 2006/067313 A1 | 6/2006 |
| WO | WO 2009/130661 A2 | 10/2009 |
| WO | WO 2013/008177 A1 | 1/2013 |

* cited by examiner

BEVERAGE PREPARATION MACHINE EQUIPPED WITH A ROTATING STIRRING DEVICE AND A COFFEE NOZZLE

CROSS REFERENCE TO RELATED APPLICATIONS

This application claims priority to French Patent Application No. 1854732, filed May 31, 2018, the entire content of which is incorporated herein by reference in its entirety.

FIELD

This invention relates to the general technical field of beverage preparation machines, in particular automatic coffee machines for making preparations based on milk and/or coffee.

BACKGROUND

From document EP2268174 we know of a beverage preparation machine comprising a frame equipped with a cup holder, at least one coffee dispensing nozzle comprising an outlet orifice and a rotating stirring device comprising a tool rotating about an axis A. The rotating tool is intended to cooperate with a preparation contained in a container resting on the cup holder. The rotating stirring device comprises a conduit for conveying hot water and/or steam toward the rotating tool.

The beverage preparation machine comprises a "coffee" area and a "milk" area in which the rotating stirring device is arranged. The coffee dispensing nozzle is able to move between a coffee position, in which the coffee is dispensed into a container resting in the "coffee" area, and a milk position, in which the coffee is dispensed into a container resting in the "milk" area in order to make a preparation based on milk and coffee, in particular a cappuccino.

Thus, according to the type of preparation desired, the user must maneuver the coffee dispensing nozzle before initiating the making of the preparation.

In addition, a beverage preparation machine which has separate "coffee" and "milk" areas is relatively cumbersome.

In this beverage preparation machine, the rotating stirring device is fixed and the user must tilt the container in order to pass it under the rotating tool to put it into place or remove it from the "milk" area.

SUMMARY

An aspect of this invention is to remedy the aforementioned drawbacks and to propose a beverage preparation machine that is simple and ergonomic to use, in particular for making a preparation based on milk and coffee.

Another aspect of this invention is to propose a beverage preparation machine that has a compact and simple construction and is economical to use.

These aspects are achieved with a beverage preparation machine comprising a frame equipped with a cup holder, at least one coffee dispensing nozzle comprising an outlet orifice and a rotating stirring device comprising a tool rotating about an axis A and intended to cooperate with a preparation contained in a container resting on the cup holder, the rotating stirring device comprising a conduit for conveying hot water and/or steam toward the rotating tool, wherein the rotating stirring device is mobile or moveable in vertical translation parallel to the axis A between a top standby position, in which the rotating tool is situated above the container, and a bottom working position, in which the rotating tool is situated in the container, and wherein the outlet orifice is separated from the rotating stirring device and arranged at a distance D from the axis A of rotation of the rotating tool, the distance D being constant and smaller than 6 cm, for example smaller than 4 cm in an embodiment, so that the outlet orifice of the coffee dispensing nozzle and the rotating tool are arranged above an upper opening of the container arranged on the cup holder.

"The distance D is constant" is understood to mean that the distance D is measured in a plane perpendicular to the axis A which passes through the outlet orifice.

Thus, the beverage preparation machine comprises a single area for placing the container for making a coffee-based preparation, a milk-based preparation or a preparation based on milk and coffee. Consequently, the beverage preparation machine may present a compact construction.

In addition, the distance between the outlet orifice of the coffee dispensing nozzle and the rotating tool is sufficiently reduced to be adapted to an upper opening of the majority of containers used to make a preparation based on milk and coffee.

Beneficially, the distance D is smaller than 2 cm.

"The outlet orifice is separated from the rotating stirring device" is understood to mean that the rotating stirring device can be moved by itself, without moving the outlet orifice.

In an embodiment, the outlet orifice of the coffee dispensing nozzle is arranged so as to be fixed with respect to the frame.

Thus, the beverage preparation machine presents a simple construction.

Beneficially, the outlet orifice and the rotating tool are substantially in the same horizontal plane P1 when the rotating stirring device is in the top standby position.

"The outlet orifice and the rotating tool are substantially in the same horizontal plane P1" is understood to mean that a distance between the outlet orifice and the rotating tool, measured according to a vertical direction, is smaller than 10 millimeters.

Thus, the user easily places the container to make the preparation based on milk and coffee under the rotating stirring device in the top standby position and under the outlet orifice. He only manipulates the rotating stirring device to position the rotating tool in the container if necessary.

In an embodiment, the horizontal plane P1 and a horizontal plane P2 passing through an upper face of the cup holder are separated by a height H, the height H being greater than 10 cm, for example greater than 15 cm in an embodiment. Thus, the beverage preparation machine can accept large-capacity containers.

Beneficially, the stroke of the rotating stirring device between the top standby position and the bottom working position is substantially equal to the height H.

Beneficially, the cup holder can be adjusted in height with respect to the frame between a bottom position for receiving large containers and a top position for receiving small containers.

Thus, the upper opening of the container can be positioned very close to the outlet orifice of the coffee dispensing nozzle to prevent splashes.

In an embodiment, the coffee dispensing nozzle is mobile or moveable in vertical translation parallel to the axis A between a raised position, in which the outlet orifice is intended to cooperate with a large container, and a lowered position, in which the outlet orifice is intended to cooperate with a small container.

Thus, the outlet orifice of the coffee dispensing nozzle can be positioned very close to the upper opening of the container to prevent splashes.

In an embodiment, the machine for dispensing beverages comprises a control circuit equipped with a control element designed to initiate a preparation based on milk and coffee with a single action, in particular a single press.

Thus, the user can make a preparation based on milk and coffee by manipulating the dispensing head and pressing the control element.

Beneficially, the rotating stirring device comprises an electric motor intended to drive the rotating tool.

Thus, the electric motor is arranged on the dispensing head, very close to the rotating tool. In addition, the rotation speed of the rotating tool can be adapted, in particular according to the type of preparation.

In an embodiment, the conduit for conveying hot water and/or steam comprises a tubular portion which extends along the axis A between a first extremity on which the rotating tool is arranged and a second extremity arranged on a drive shaft.

Thus, the tubular portion performs two functions: conveying the hot water and/or steam toward the rotating tool and driving the rotating tool.

Advantageously, the tubular portion presents a length equal to the stroke of the rotating stirring device between the top standby position and the bottom working position.

In an embodiment, the tubular portion is removably arranged on the drive shaft.

"Removably arranged" is understood to mean that the tubular portion can be dismounted from the drive shaft without a tool.

Such an arrangement makes it possible to clean the rotating tool easily after preparation of a drink. In addition, once the rotating tool is removed, the dispensing head can be positioned above a container to dispense hot water through the hollow portion of the drive shaft, the motor not being running.

Beneficially, the drive shaft comprises a hollow portion for conveying hot water and/or steam, on which the tubular portion is arranged, and the hollow portion comprises an outlet orifice for hot water and/or steam.

If the outlet orifice of the coffee dispensing nozzle is fixed with respect to the frame, the outlet orifice for hot water and/or steam and the outlet orifice for coffee are substantially in the same horizontal plane P1 when the rotating stirring device is in the bottom working position with the tubular portion removed.

Thus, the drive shaft conveys the hot water and/or steam either toward the rotating tool, if the tubular portion is in place, or directly into the container, if the tubular portion is removed.

In an embodiment, the rotating stirring device comprises a steam box, the steam box comprising a chamber, a radial steam inlet channel and two sealed guide bearings of the drive shaft of the rotating tool; and the hollow portion for conveying hot water and/or steam connects the chamber to the tubular portion.

In an embodiment, the rotating tool is mobile or moveable with respect to the outlet orifice in a horizontal plane.

Thus, the rotating tool can be positioned substantially at the center of the container or, for certain recipes, voluntarily shifted by the user.

Beneficially, the frame comprises a front face and the coffee dispensing nozzle and the rotating tool are arranged in front of the front face.

Thus, the rotating tool as well as the stirring device are easily accessible by the user, in particular in order to move them vertically. In the event that the dispensing nozzle is mobile, this is also easily accessible by the user in order to move it.

In an embodiment, the coffee dispensing nozzle and the rotating tool are arranged side by side in a vertical plane parallel to the front face of the frame.

Beneficially, the coffee dispensing nozzle and the rotating tool are arranged on either side of a vertical plane perpendicular to the vertical plane parallel to the front face of the frame.

BRIEF DESCRIPTION OF THE DRAWINGS

The invention will be more fully understood in consideration of the embodiment, which is in no way restrictive, illustrated in the attached figures, in which.

DETAILED DESCRIPTION

Figure 1:
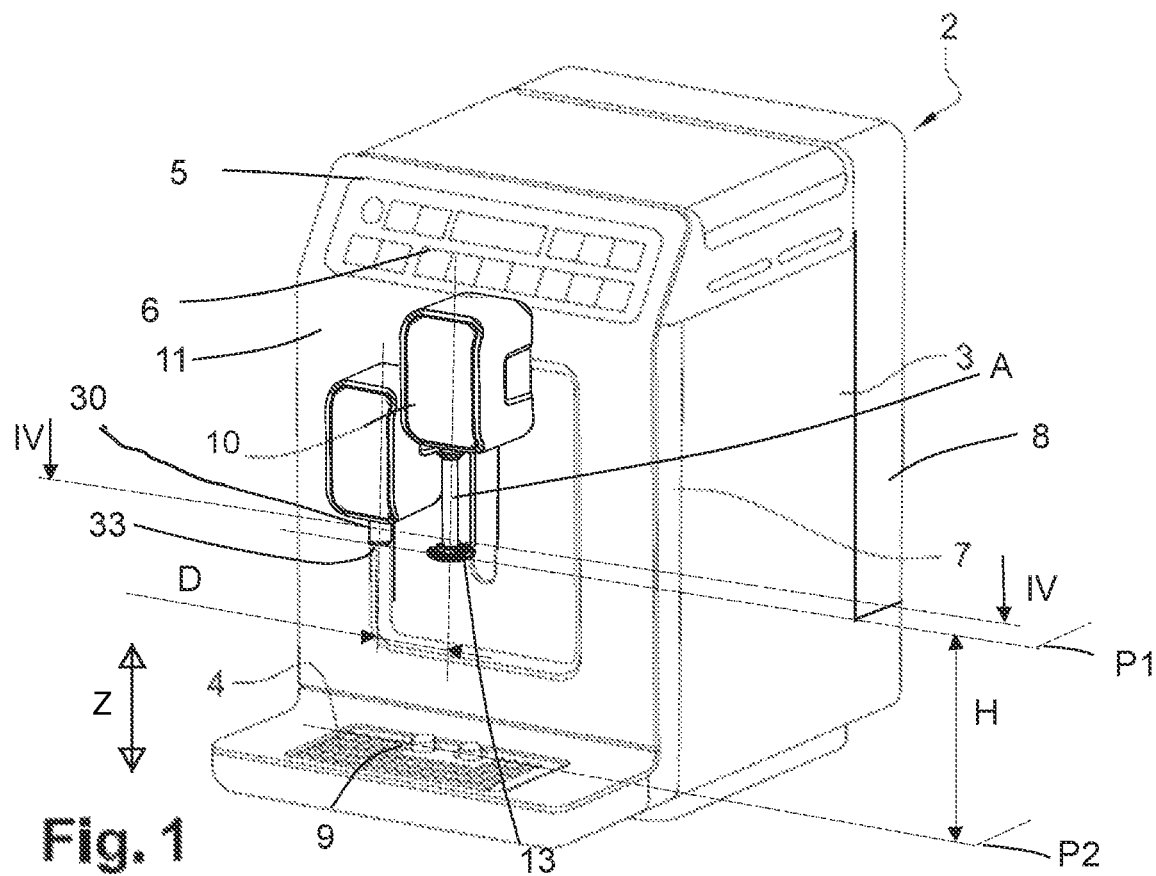
FIG. 1 illustrates a perspective view of a beverage preparation machine according to a particular embodiment of the invention.
Figure 2:
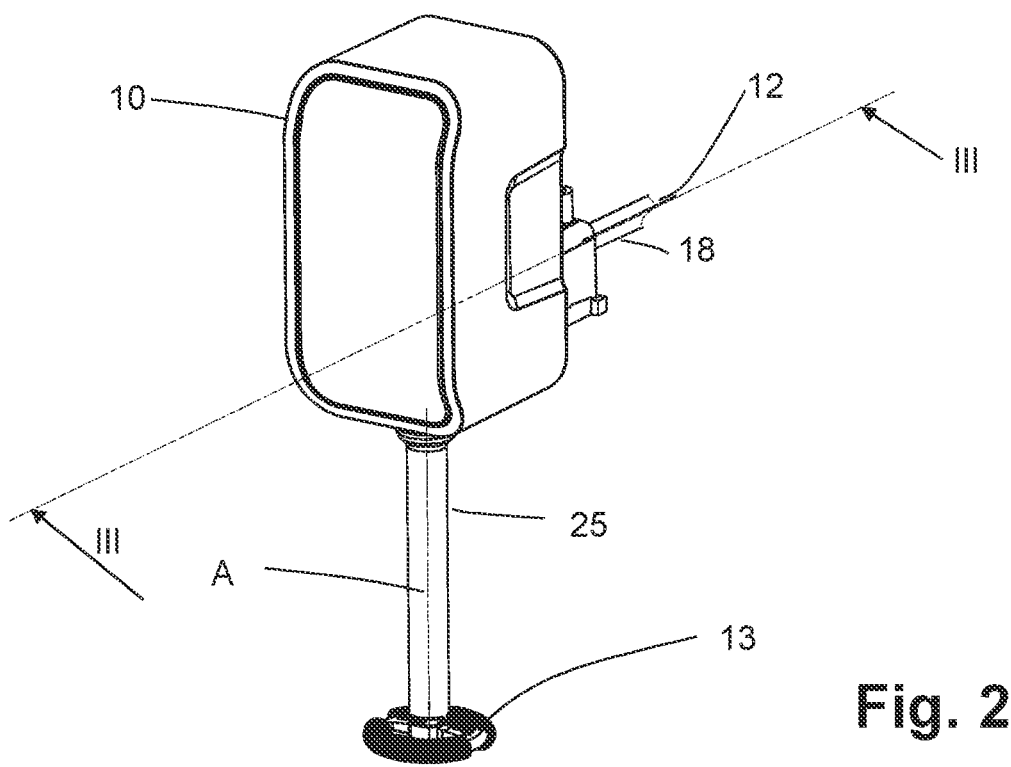
FIG. 2 illustrates a perspective view of the rotating stirring device of the beverage preparation machine illustrated in FIG. 1.

Note that, in this document, the terms "horizontal," "vertical," "lower," "upper," "longitudinal," "transversal," "top" and "bottom" used to describe the machine for dispensing beverages, refer to this machine resting on a work surface, in a use situation.

In the embodiment example represented in FIGS. 1 to 4, a beverage preparation machine 2 comprises a frame 3, a cup holder 4 on which a container can be placed. The cup holder 4 may, for example, comprise a support grid and a drip tray. The cup holder comprises an upper face 9 extending in a horizontal plane P2. The beverage preparation machine 2 comprises a coffee dispensing nozzle 30 which is arranged to be integral with the frame 3 and a height-adjustable rotating stirring device 10. The rotating stirring device 10 is mounted such that it can slide according to a vertical translation on a support plate 7 adjacent to the frame 3.

The rotating stirring device 10 comprises a tool 13 rotating about an axis A and intended to cooperate with a preparation contained in the container. The rotating stirring device 10 comprises a conduit 12 for conveying hot water and/or steam toward the rotating tool 13. The coffee dispensing nozzle 30 comprises an outlet orifice 33 for coffee. The coffee dispensing nozzle 30 and the rotating tool 13 are arranged side by side in a vertical plane parallel to a front face 11 of the frame 3. The coffee dispensing nozzle 30 is part of a dispensing circuit for the coffee produced in a brewing device (not represented in the figures). The beverage preparation machine 2 comprises a reservoir 8 forming a cold water supply, the brewing device being supplied with hot water by a boiler (not represented in the figures). The brewing device may comprise a chamber intended to receive the ground coffee coming from a coffee grinder integrated in the dispenser or a coffee capsule. In the event the chamber is intended to receive a capsule, the construction of the machine can be very compact.

The rotating stirring device 10 is mobile or moveable in vertical translation between a top standby position, in which the rotating tool 13 is situated above the container, and a bottom working position, in which the rotating tool 13 is situated in the container. As visible in FIGS. 1 and 4, the axis A of rotation of the rotating tool 13 and the outlet orifice are separated by a distance D. The distance D is smaller than 6 cm, for example smaller than 4 cm in an embodiment, so that the outlet orifice 33 of the coffee dispensing nozzle 30 and the rotating tool 13 are arranged vertically with respect to the upper opening 40 (FIG. 4) of the container arranged on the cup holder 4. The distance D may be sufficiently reduced so that the rotating tool 13 is arranged at the center of the container, the outlet orifice 33 being arranged above and on the periphery of the upper opening 40. In a particular embodiment, the distance D is smaller than 2 cm.

The outlet orifice 33 and the rotating tool 13 are in the same horizontal plane P1 when the rotating stirring device 10 is in the top standby position. The horizontal plane P1 and the horizontal plane P2 passing through the upper face 9 of the cup holder 4 are separated by a height H equal to 11 cm. The stroke of the rotating stirring device 10 between the top standby position and the bottom working position is substantially equal to the height H so that the rotating tool 13 can be positioned very close to a bottom of the container.

The cup holder 4 is height adjustable, as schematically illustrated by the arrow Z in FIG. 1, for example by means of a motorized system or a mechanical system in which the cup holder comprises side blades which cooperate with openings arranged in the frame (not represented in the figures).

In a variant embodiment, the cup holder 4 is fixed with respect to the frame and the coffee dispensing nozzle 30 is mobile in vertical translation parallel to the axis A between a raised position, in which the outlet orifice 33 is intended to cooperate with a large container, and a lowered position, in which the outlet orifice (33) is intended to cooperate with a small container.

Figure 3:
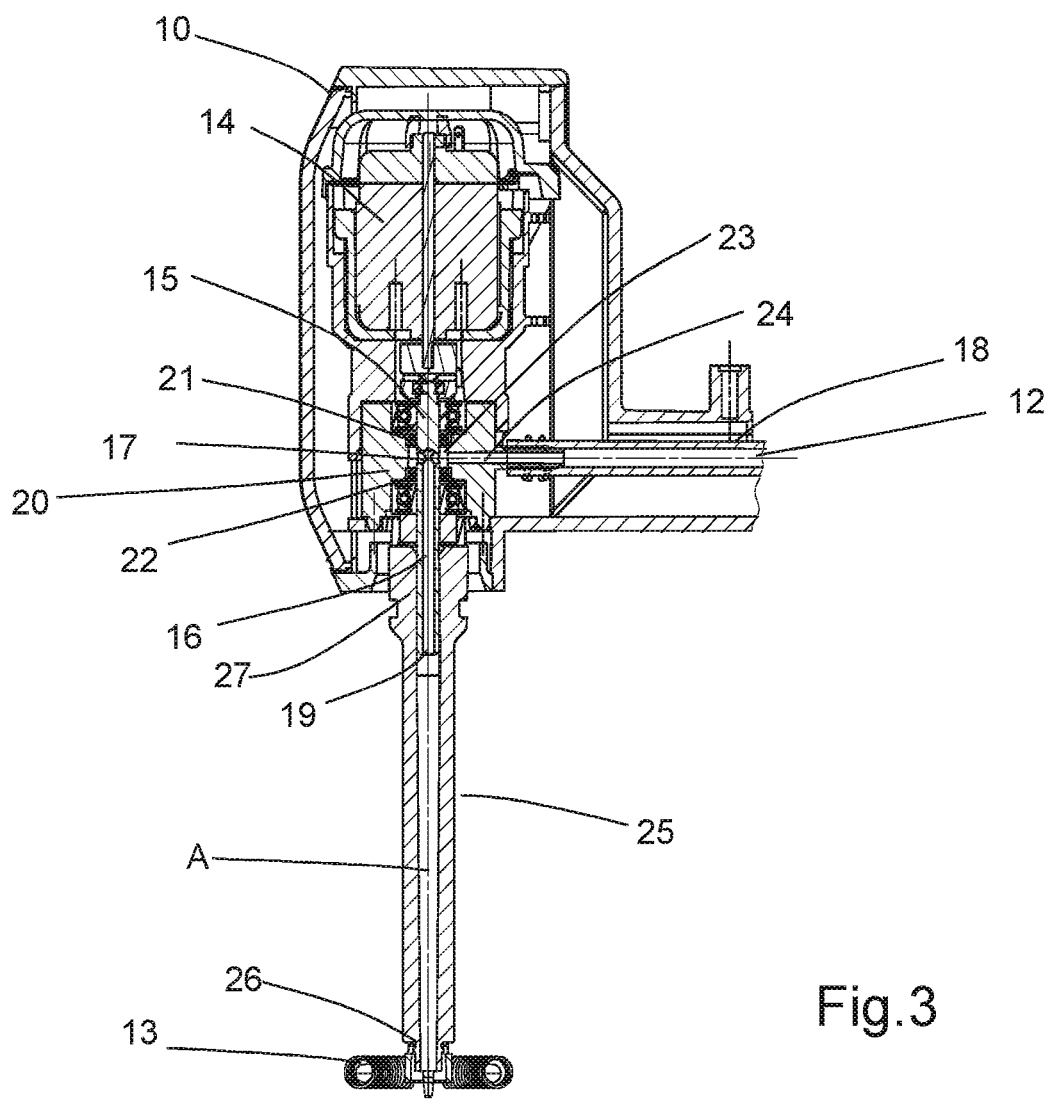
FIG. 3 illustrates a cross-section view according to line III-III of the beverage preparation machine illustrated in FIG. 2.
Figure 4:
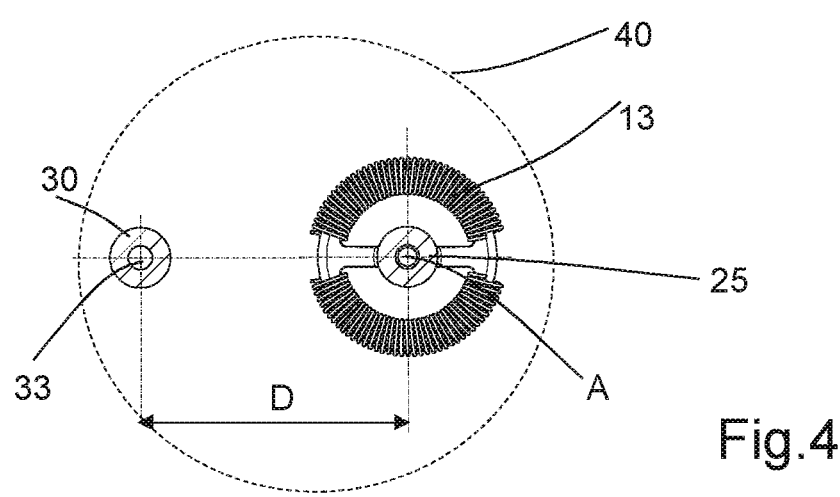
FIG. 4 illustrates a partial cross-section view according to line IV-IV of the rotating stirring device and of the coffee dispensing nozzle of the beverage preparation machine illustrated in FIG. 1.

As visible in FIG. 3, the rotating stirring device 10 comprises an electric motor 14, a drive shaft 15, a steam box 20 and the rotating tool 13. The rotating tool 13 is arranged at a first extremity 26 of a tubular portion 25. The tubular portion 25 extends along the axis A and comprises a second extremity 27 arranged on the drive shaft 15.

The steam box 20 is crossed by the drive shaft 15 and comprises two sealed guide bearings 21, 22 of the drive shaft 15. The steam box 20 comprises between the two bearings 21, 22 a chamber 23 supplied with hot water and/or steam by a radial channel 24. The drive shaft 15 presents a hollow portion 16 on which is arranged the second extremity 27 of the tubular portion 25. The hollow portion 16 comprises through openings 17 which allow the interior of the hollow portion 16 to communicate with the chamber 23. Thus, the conduit 12 for conveying hot water and/or steam from the rotating stirring device 10 comprises the radial channel 24, the chamber 23, the through openings 17, the hollow portion 16 and the tubular portion 25. The conduit 12 for conveying hot water and/or steam also comprises a flexible conduit 18 to allow the rotating stirring device 10 to be mobile or moveable with respect to the cup holder 4.

The tubular portion 25 and the rotating tool 13 form an assembly which is removable from the rotating stirring device 10. The tubular portion 25 is mounted such that it can slide on the hollow portion 16 of the drive shaft 15 with a slight tightening to ensure the drive in rotation. Other types of dismountable assemblies, in particular using bayonet closures, are possible.

The hollow portion 16 comprises an outlet orifice 19 for hot water and/or steam. In order to dispense hot water and/or steam, the tubular portion 25 and the rotating tool 13 can be removed and the rotating stirring device 10 can be placed in the bottom position, above a container arranged on the cup holder 4. In the bottom position, the outlet orifice 19 for hot water and/or steam and the outlet orifice 33 for coffee are substantially in the same horizontal plane P1.

"The outlet orifice 19 for hot water and/or steam and the outlet orifice 33 are substantially in the same horizontal plane P1" is understood to mean that a distance between the outlet orifice 19 of the hollow portion 16 and the outlet orifice 33 of the coffee dispensing nozzle 30, measured according to a vertical direction, is smaller than 10 millimeters.

The beverage preparation machine 2 comprises a control circuit 5 (FIG. 1) for control and management of the beverage preparation cycles. The control circuit 5 comprises several control elements 6 designed to each initiate a preparation based on milk and coffee, such as a cappuccino or a latte, with a single press.

In operation, when the user wants to make a preparation based on milk and coffee, in particular a cappuccino, he pours milk into a container and places it on the cup holder 4 so that the upper opening 40 is under the coffee dispensing nozzle 30 and under the rotating stirring device 10 which is in the top standby position. The user then moves the rotating stirring device 10 into the bottom working position to bring the rotating tool 13 into the milk. The user then presses on the control element 6 to initiate the cappuccino preparation cycle. The control circuit 5 controls the startup of the motor 14 to make the rotating tool 13 turn and controls the boiler to produce steam, which will reach the milk through the conveying conduit 12. Thus, the milk will be heated and foamed.

After a predetermined time period, the control circuit 5 stops the motor 14 and the arrival of the steam, and then controls the making of a coffee which will flow into the container through the outlet orifice 33 of the coffee dispensing nozzle 30. Once the preparation is finished, the user lifts the rotating stirring device 10 and can uncouple the rotating tool 13 and the tubular portion 25 in order to clean them, by putting them in a dishwasher, for example.

It will be appreciated that the invention is in no way limited to the embodiments described and illustrated, which have been provided only as examples. Modifications are still possible, in particular from the point of view of composition of the various components or by substitution of equivalent techniques, without departing from the scope of protection of the invention.

In an embodiment variant, the coffee dispensing nozzle 30 and the rotating tool 13 are arranged side by side in a vertical plane perpendicular to the front face 11 of the frame 3, in particular, the nozzle 30 is arranged between the rotating tool 13 and the front face 11.

The invention claimed is:

1. A beverage preparation machine comprising a frame equipped with a cup holder, at least one coffee dispensing nozzle comprising an outlet orifice and a rotating stirring device comprising a tool adapted to rotate about an axis and adapted to cooperate with a preparation contained in a container resting on the cup holder, the rotating stirring device comprising a conduit adapted to convey hot water or steam toward the rotating tool, wherein the rotating stirring device is moveable in vertical translation parallel to the axis between a top standby position, in which the rotating tool is situated above the container, and a bottom working position, in which the rotating tool is situated in the container, and wherein the outlet orifice is separated from the rotating stirring device and arranged at a distance from the axis of rotation of the rotating tool, the distance being constant and smaller than 6 cm so that the outlet orifice of the coffee dispensing nozzle and the rotating tool are arranged above an upper opening of the container arranged on the cup holder, wherein the outlet orifice and the rotating tool are in a same first horizontal plane when the rotating stirring device is in the top standby position, wherein the cup holder is adjustable in height with respect to the frame between a bottom position for receiving larger containers and a top position for receiving smaller containers, and wherein the coffee dispensing nozzle is moveable in vertical translation parallel to the axis between a raised position, in which the outlet orifice is intended to cooperate with a larger container, and a lowered position, in which the outlet orifice is intended to cooperate with a smaller container.

2. The beverage preparation machine according to claim 1, wherein the outlet orifice of the coffee dispensing nozzle is arranged so as to be fixed with respect to the frame.

3. The beverage preparation machine according to claim 1, wherein the first horizontal plane and a second horizontal plane passing through an upper face of the cup holder are separated by a height, the height being greater than 10 cm.

4. The beverage preparation machine according to claim 3, wherein the height is greater than 15 cm.

5. The beverage preparation machine according to claim 1, further comprising a control circuit equipped with a control element configured to initiate a preparation based on milk and coffee with a single action.

6. The beverage preparation machine according to claim 5, wherein the single action is a single press.

7. The beverage preparation machine according to claim 1, wherein the rotating stirring device comprises an electric motor adapted to drive the rotating tool.

8. The beverage preparation machine according to claim 1, wherein the conduit for conveying hot water or steam comprises a tubular portion which extends along the axis between a first extremity on which the rotating tool is arranged and a second extremity arranged on a drive shaft.

9. The beverage preparation machine according to claim 8, wherein the tubular portion is removably arranged on the drive shaft.

10. The beverage preparation machine according to claim 9, wherein the drive shaft comprises a hollow portion for conveying hot water or steam, on which the tubular portion is arranged, and wherein the hollow portion comprises an outlet orifice for hot water or steam.

11. The beverage preparation machine according to claim 10, wherein the rotating stirring device comprises a steam box, the steam box comprising a chamber, a radial steam inlet channel and two sealed guide bearings of the drive shaft of the rotating tool, and wherein the hollow portion for conveying hot water or steam connects the chamber to the tubular portion.

12. The beverage preparation machine according to claim 10, wherein the coffee dispensing nozzle and the rotating tool are arranged side by side in a vertical plane parallel to the front face of the frame.

13. The beverage preparation machine according to claim 1, wherein the frame comprises a front face and wherein the coffee dispensing nozzle and the rotating tool are arranged in front of the front face.

14. The beverage preparation machine according to claim 1, wherein the distance is smaller than 4 cm.

* * * * *